(12) United States Patent
Yoest et al.

(10) Patent No.: US 9,746,925 B2
(45) Date of Patent: Aug. 29, 2017

(54) HAPTIC FEEDBACK DEVICE USING A DUAL COIL LINEAR SOLENOID

(71) Applicant: Raw Thrills, Inc., Skokie, IL (US)

(72) Inventors: Robert Steven Yoest, Northbrook, IL (US); Kevin Thomas Uskali, Chicago, IL (US)

( * ) Notice: Subject to any disclaimer, the term of this patent is extended or adjusted under 35 U.S.C. 154(b) by 0 days.

(21) Appl. No.: 15/158,524

(22) Filed: May 18, 2016

(65) Prior Publication Data
US 2016/0342211 A1   Nov. 24, 2016

Related U.S. Application Data

(60) Provisional application No. 62/179,823, filed on May 20, 2015.

(51) Int. Cl.
| G08B 6/00 | (2006.01) |
| G09B 21/00 | (2006.01) |
| H04B 3/36 | (2006.01) |
| G06F 3/01 | (2006.01) |
| A63F 13/285 | (2014.01) |

(52) U.S. Cl.
CPC ............ G06F 3/016 (2013.01); A63F 13/285 (2014.09)

(58) Field of Classification Search
CPC ...... G06F 3/016; A63F 13/285; A63F 13/837; G08B 6/00

USPC ............................... 340/407.2; 715/701, 702
See application file for complete search history.

(56) References Cited

U.S. PATENT DOCUMENTS

| 5,300,108 | A | * | 4/1994 | Rebell | ................... | A61N 1/0573 |
| | | | | | | 607/127 |
| 5,507,488 | A | | 4/1996 | Eddy et al. | | |
| 6,100,874 | A | * | 8/2000 | Schena | ................... | G06F 3/016 |
| | | | | | | 345/157 |
| 7,637,360 | B2 | * | 12/2009 | Carlson | ................... | A47C 1/03 |
| | | | | | | 188/267.2 |
| 2016/0084605 | A1 | * | 3/2016 | Monti | .............................. | 3/837 |

* cited by examiner

*Primary Examiner* — John A Tweel, Jr.
(74) *Attorney, Agent, or Firm* — Taft Stettinius & Hollister LLP

(57) ABSTRACT

A haptic feedback device including a dual coil linear solenoid is provided. The dual coil linear solenoid construction provides a sense of a pulling force in an opposite direction from a pushing force sensed in the player's hand. A dynamic current source for each coil is disposed to generate dynamic magnetic flux in each coil, whereby a dynamic bi-directional force is exerted on the plunger. A plunger position controller controls the position of the plunger, whereby the plunger position controller applies a dynamic bi-directional force on the plunger to move the plunger to a target position based on the current position of the plunger detected by a plunger position sensor. The haptic feedback device is incorporated into a game controller. Video or arcade games incorporating the feedback device are also disclosed.

20 Claims, 9 Drawing Sheets

HAPTIC FEEDBACK DEVICE USING A DUAL COIL LINEAR SOLENOID

CROSS-REFERENCE TO RELATED APPLICATIONS

Priority is claimed to U.S. Provisional Patent Application No. 62/179,823, filed on May 20, 2015, the contents of which are incorporated by reference herein in their entirety.

TECHNICAL FIELD

The present disclosure relates generally to a haptic feedback device for a controller for a video or arcade game. The disclosure also relates to hand-held game control devices, and arcade or video games that incorporate the haptic feedback device.

BACKGROUND

In the coin operated video game industry, it has been known to provide devices that offer haptic feedback to players of games in order to enhance their playing experience with a feeling that reflects the environment depicted in the game. Various techniques have been used to provide motion or sensory feedback to players via game components, particularly game input devices such as hand-held game controllers. Both motors and solenoids have been used, for example, to provide haptic feedback to players of games having gun motion simulation devices installed in hand-held gun-style game controllers. The motors would use a cam/follower, offset crank, slotted yoke, or rack and pinion type of assembly to induce a linear motion to the controller to be felt by the player. The solenoids would pull a rod inwardly against spring resistance, allowing the rod to collide with a stop within the coil of the solenoid. The rod would then be released, and the compressed spring would push the rod back outwardly, so that the rod would then collide into a damping material where it would remain until the coil is energized again.

Such prior devices have had the drawbacks of limited directional forces provided by game controllers, which limit the level of realism experienced by the player. Further developments are therefore needed in the field to enhance operation of game controllers in order to supply a superior haptic feedback experience to a player.

SUMMARY OF THE INVENTION

An object of the invention is to provide a new and improved haptic feedback device employing a dual coil linear solenoid. The dual coil linear solenoid construction offers operational and efficiency benefits not available from prior art devices. In particular, the dual coil construction allows a sense of a pulling force in an opposite direction from a pushing force sensed in the player's hand. With preferred energization patterns, the device provides a variety of shaking and backward/forward motion patterns to realistically mimic conditions depicted in the game. The haptic feedback device is incorporated into a game controller in a preferred embodiment of the invention. Video or arcade games incorporating the feedback device are also disclosed.

DETAILED DESCRIPTION

Figure 1:
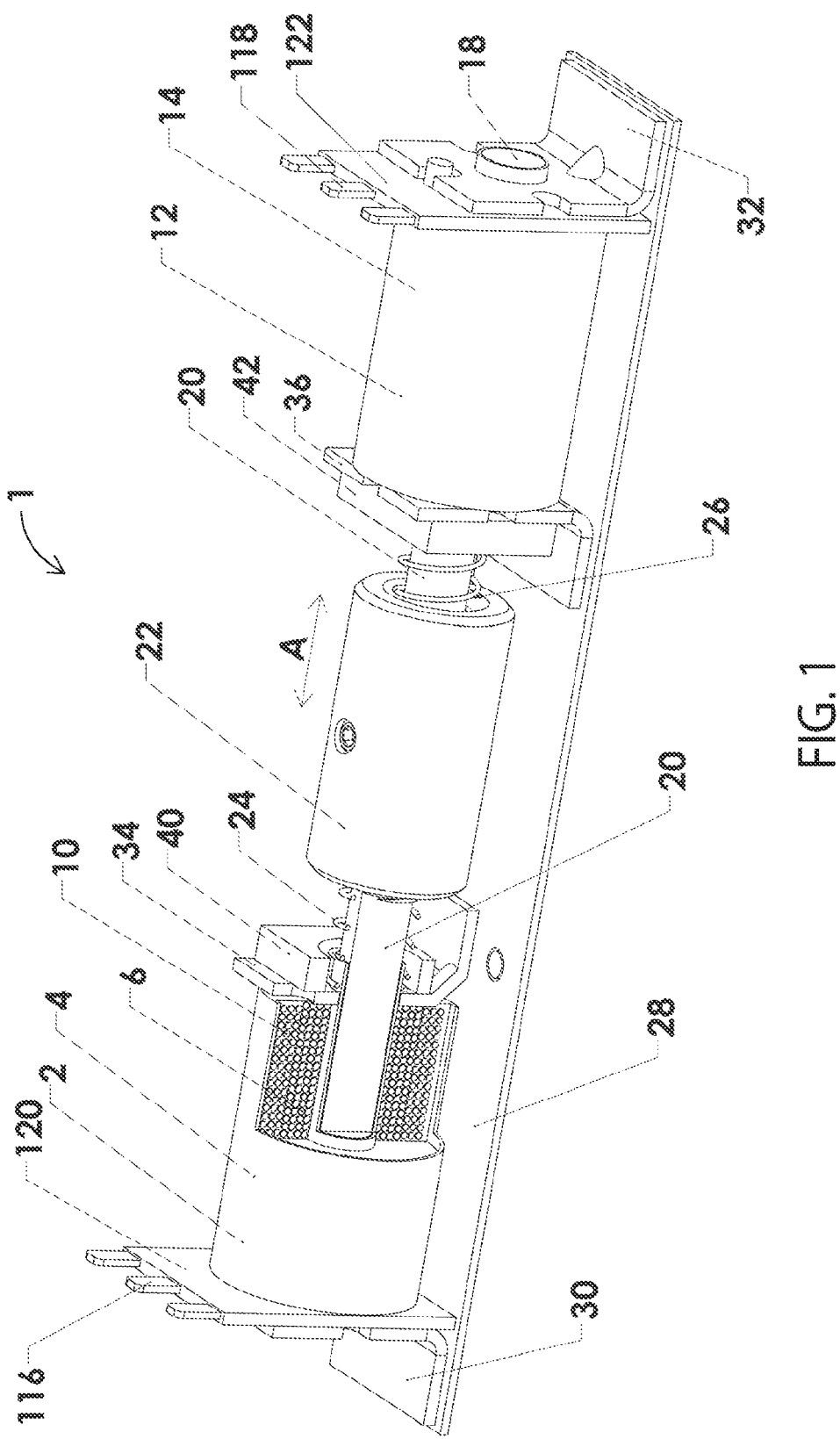
FIG. 1 is a perspective view of a haptic feedback device with a portion of a coil and rod cut away to show a cross-sectional view of certain interior features.

FIG. 1 is a perspective view of a haptic feedback device in its resting, non-activated position, with a portion of the first coil and rod cut away to show a cross-sectional view of interior features. The haptic feedback device 1 includes a dual coil linear solenoid arrangement, with a rod 20 shared by the two solenoid coils designated with reference numerals 2 and 12. A solenoid coil is arranged at each one of the opposite ends of the shared rod 20. Each solenoid coil 2, 12 may be surrounded by a coil cover (4, 14 respectively), which may be formed of materials known in the field, such as paper, cardboard, thermoplastic materials, or magnetically conductive metal.

The shared rod 20 acts as a movable plunger within a core or sleeve that is formed inside each one of the two coils 2, 12 as in typical solenoid arrangements. The rod 20 is supported so as to move or reciprocate in a backward and forward direction along its longitudinal axis between the two coils 2, 12, the direction shown as arrow A in FIG. 1. A weight 22 is fixed to the rod, arranged on the rod at a position preferably near a center point along the longitudinal axis of the rod 20, and the weight 22 is carried along with the rod 20 as the rod 20 moves along direction A.

The coils 2, 12 are secured into a position relative to one another by a set of braces attached to a frame 28. First and second outer braces 30, 32 secure the outer ends of the bodies of the first and second coils 2, 12, respectively. At the outer end of each coil there may preferably be formed a coil connection mount as part of the coil. The first coil connection mount 120 is depicted in FIG. 1. The first coil connection mount 120 preferably is a non-conductive thermoplastic portion that is integrally formed with a non-conductive thermoplastic core of the coil 2, around which the solenoid coil windings are wound, and inside which the rod 20 will slide freely. The first coil connection mount 120 preferably supports electrical supply connections 116 (three shown in FIG. 1; one is labeled with reference numeral 116). The first coil electrical supply connections 116 are operatively connected to provide electrical supply and ground connections between an electrical supply source (not shown) and the conductive solenoid wire windings of first coil 2. Corresponding second coil 12 features of a second coil connection mount 122 and second coil electrical supply connections 118 are shown on the second-coil side of FIG. 1, these having similar formation, connections, and operation to those of the first coil 2. The coils 2, 12 are further secured into this position by first and second inner braces 34, 36 that abut the inner ends of the bodies of the first and second coils 2, 12, respectively. The inner braces 34, 36 also support a bearing that supports the rod while allowing the rod to move freely to make linear movements back and forth along direction A along the longitudinal axis of rod 20 between the two fixed coils 2, 12. The frame 28 preferably is shaped or adapted to be secured inside the body of a controller 38 of the video game. The frame and braces hold the first and second coils 2, 12 in a stationary position relative to one another.

First and second springs 24, 26 are positioned on each one of the lateral ends of the weight 22 to bias the position of the weight 22, and hence of the movable rod 20, to a center position between the two coils 2, 12 when the rod 20 is in its resting position. Each one of the first and second springs 24, 26 preferably is interposed or affixed between its respective inner brace 34 or 36, respectively, and one of the lateral ends of the weight 22. Preferably each spring 24, 26 is coiled to surround the rod 20, and biases the weight 20 so as to resist motion of the weight 22 toward the respective inner brace to which the spring abuts. In this way, the springs 24, 26 bias the weight 22 toward its resting central position when neither coil 2, 12 is energized.

Each coil 2, 12 is comprised of electrically conductive metal. The rod 20 is comprised of magnetically conductive metal. Each coil 2, 12 is separately connected to an electrical supply respectively, via the first coil electrical supply connections 116 on coil 2, and second coil electrical supply connections 118 on coil 12, that provide a flow of electrical current through the windings of the coil from an electrical supply source, as is known in the field. Flow of electrical current through the coil ("activation" or "energization") causes electromagnetic induction that creates a magnetic field that attracts the rod 20 further into the core or sleeve inside the energized coil, moving the rod 20 in its axial direction A further into the energized core. The magnetic flux exerts magnetic attraction that causes the movement of the rod 20 further into the energized coil 2 against the bias of the respective spring 24 of the energized coil. Similarly, energizing the second coil 12 attracts the rod 20 to move further into the second coil 12 against the bias of the second spring 26. The coils 2, 12 preferably are adapted for independent energization, each of the coils 2, 12 having its own separate electrical supply connections 116, 118, and separate electrical circuit controls.

As shown in FIG. 1, first and second damping pads 40, 42 are provided on the inner ends of each of the two coils 2, 12. Preferably, the damping pad 40, 42 on each side is provided on the inner side of its respective coil 2, 12 with the respective inner brace 34 or 36 interposed between the body of the respective coil and the weight 22. Preferably the damping pad 40, 42 is affixed to its respective inner brace 34, 36. Upon energization of a coil, for example first coil 2, the movement of the rod 20 causes the weight 22 to move into contact with the first pad 40, instead of the inner brace 34 or the coil 2 itself, providing a cushioning or dampening of the impact of the weight 22 at the end of the stroke of the rod 20 moving toward energized coil 2. The damping pad 40 also lessens noise produced by the device 1 at the end of the stroke. The same effect applies to energization of the second coil and its respective pad 42. The pads may be formed of foamed materials such as thermoplastic foams, or suitable rubber, plastic, or fabric materials suitable to cushion or dampen the impact between the weight and the coil, providing a dampened haptic effect, lower noise level, and lower wear.

Figure 2:
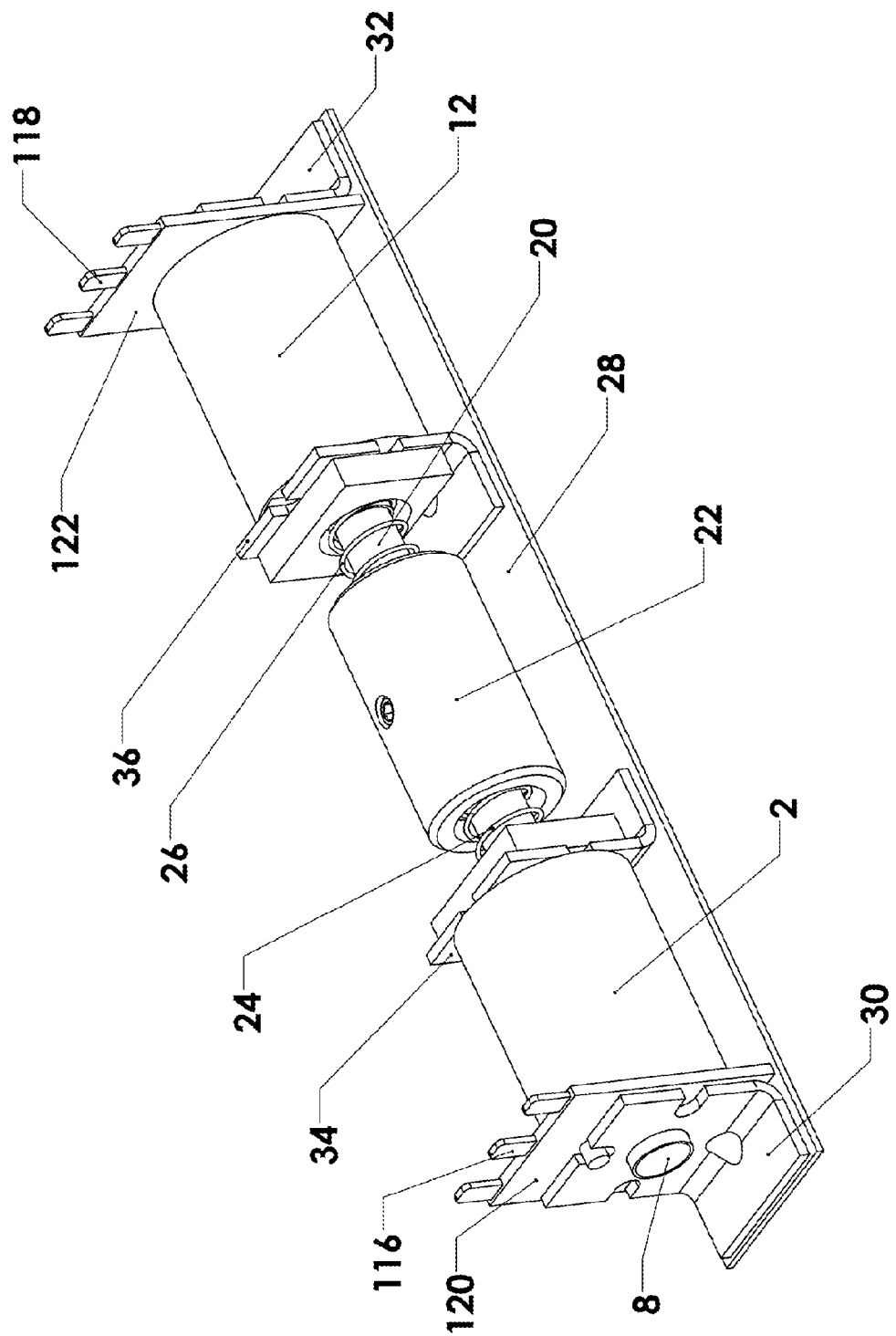
FIG. 2 is a perspective view of a haptic feedback device with neither coil energized.
Figure 3:
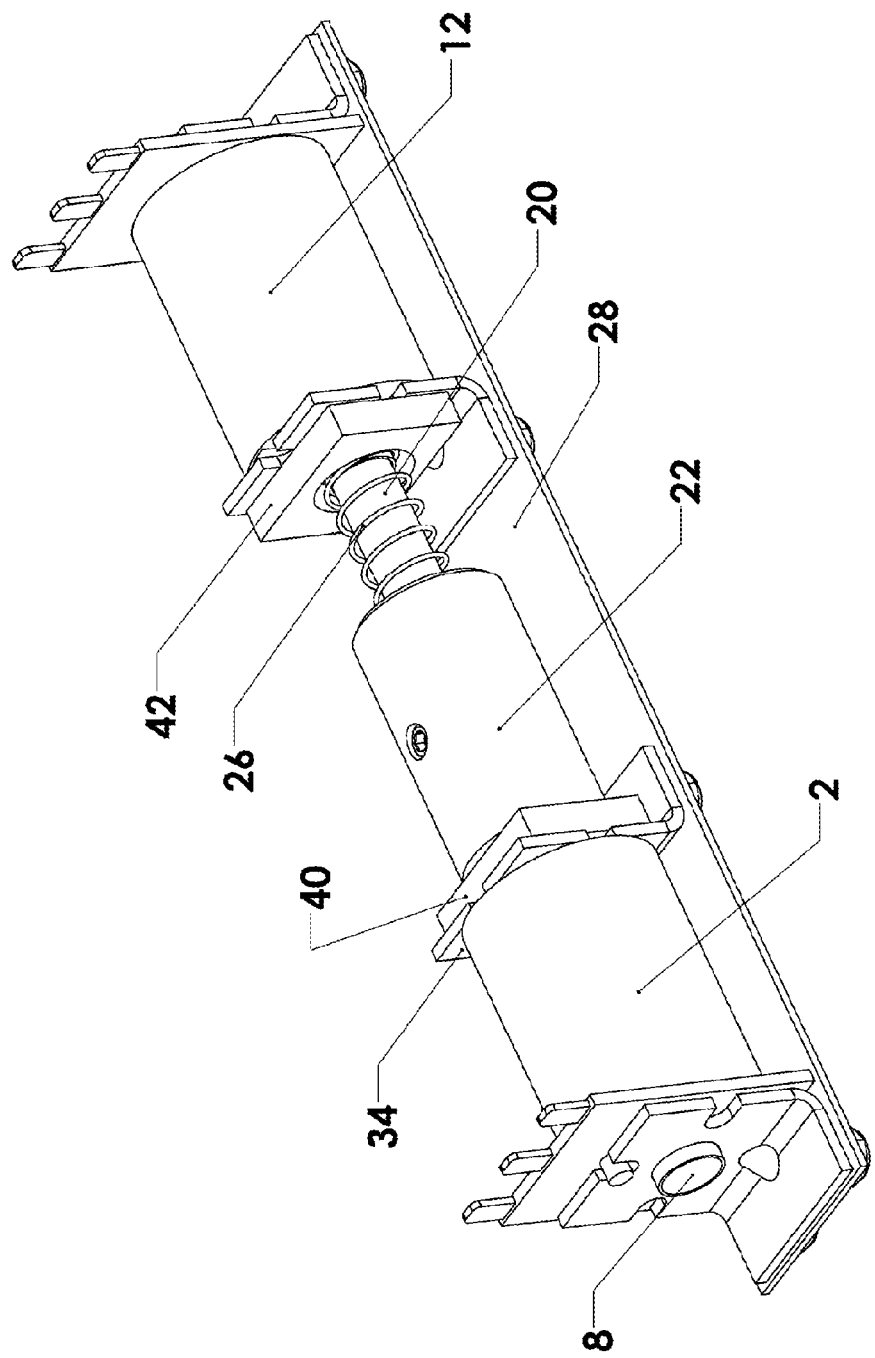
FIG. 3 is a perspective view of a haptic feedback device with the first coil energized.
Figure 4:
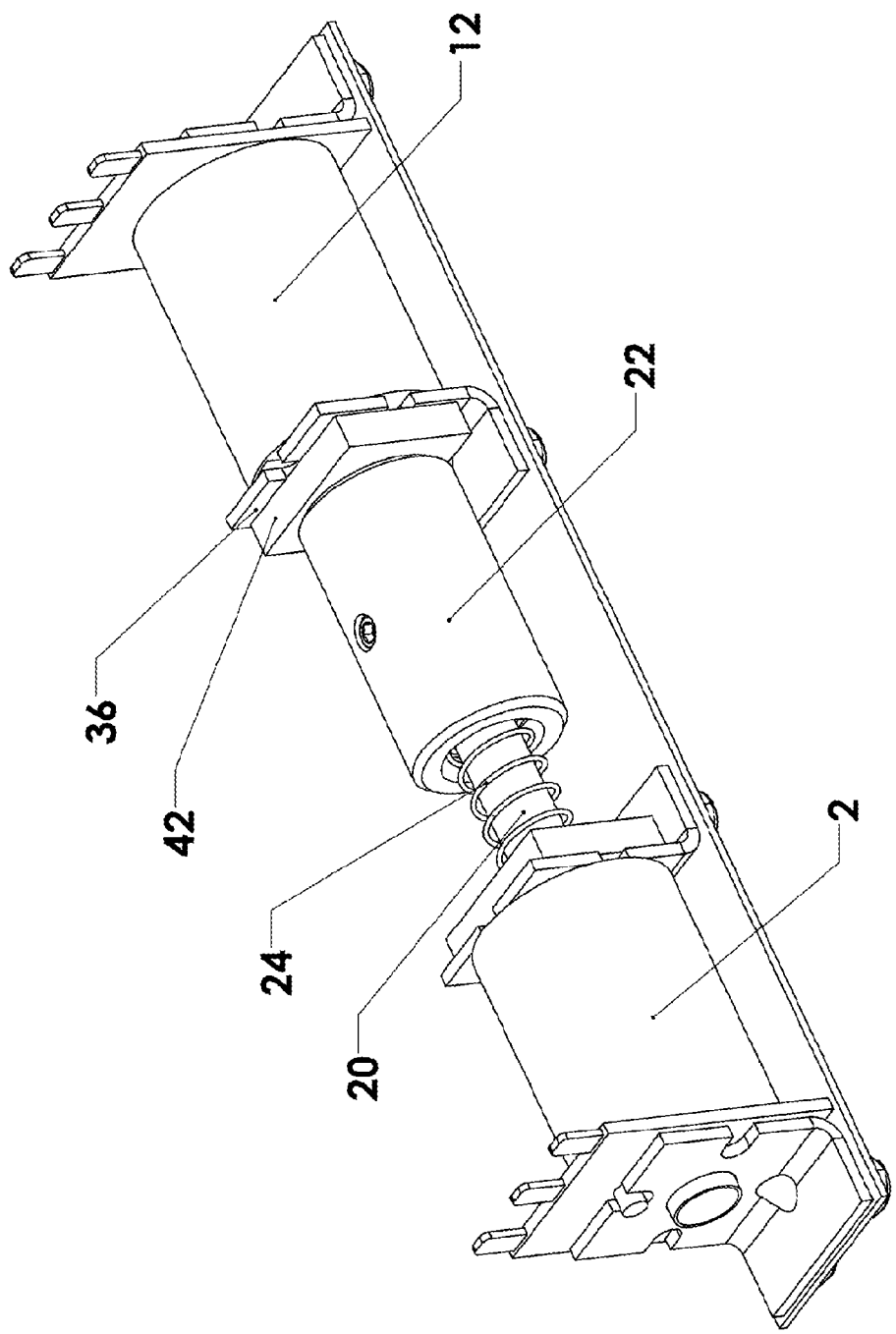
FIG. 4 is a perspective view of a haptic feedback device with the second coil energized.
Figure 5:
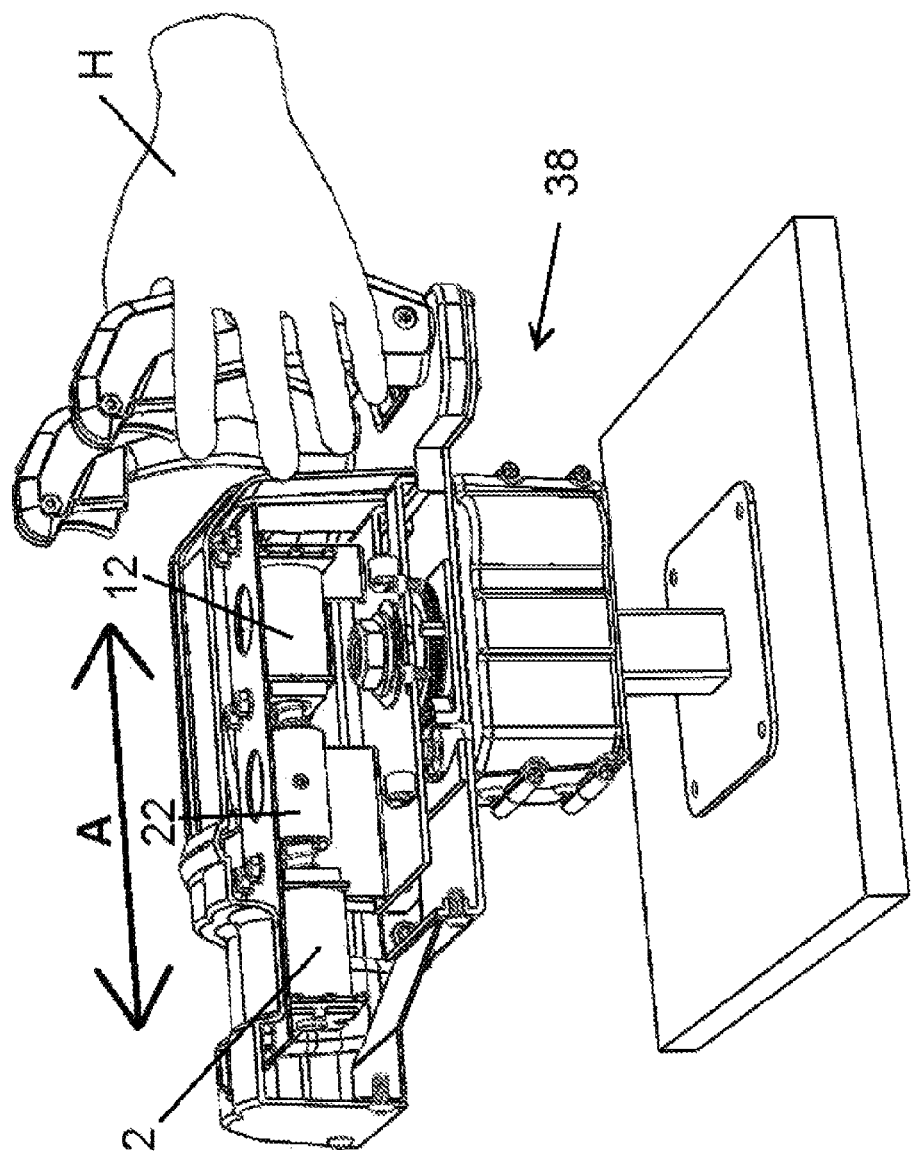
FIG. 5 is a perspective view of the device installed in a game controller, with a portion of the controller housing cut away to show certain interior features.

Such energization of a coil creates the magnetic inductance to pull the rod 20, and hence the weight 22, further in the direction of the energized coil, resulting in a collision at the end of the stroke between the weight 22 and the damping pad 40 or 42 positioned at the inner end of that coil. The initial, non-activated, resting state is depicted in FIG. 2. The position of the rod 20 pulled toward the first coil 2 in its energized state is depicted in FIG. 3, and conversely, pulled toward the second coil 12 in its energized state in FIG. 4. The collision of the weight 22 with a damping pad 40 or 42 imparts the momentum of the weight 22 in the linear direction A toward the energized coil, causing an impact that is sensed by the player's hand positioned on the controller. An embodiment of a game having a gun-style controller 38 in which the device 1 is installed and rests in it non-activated state is depicted in FIG. 5. As seen in FIG. 5, the linear movement of the rod 20 and weight 22 back and forth in direction A will yield collisions with the damping pads 40, 42, providing bumping and/or shaking sensations and other haptic feedback to the player's hand H holding the game controller 38 when the player or user plays the game.

The springs 24, 26 used in the dual coil solenoid mechanism are preferably configured as compression springs supplying a restoring force that is relatively weak as compared to springs employed with prior art solenoid devices. This is because the spring 24 or 26 as employed in this device 1 applies restoring force simply to return the rod 20 and its attached weight 22 to a central resting position after energization has been completed and the device is returning to its non-activated state (neither coil energized). Compared to a standard single coil mechanism where a large proportion of the force exerted by the coil against the rod is used to overcome the spring force, the springs employed in the dual solenoid mechanism described herein supply a smaller restoring force, and allow more of the coil's force to be transferred to the player's hand H as haptic feedback. This feature allows for a higher feedback impact to power consumption ratio. This improved ratio, in turn, helps prevent excessively high coil temperatures, which can increase electrical resistance in the coil and thus impair performance and durability of the coil. Durability is enhanced by prevention of excessively high coil temperatures that cause the coil or coil coatings such as polyurethane coil coatings to burn or otherwise deteriorate, perhaps resulting in short circuits in the coil. The improved ratio also provides for more effective haptic feedback sensations per unit of power supplied to the coil, yielding more efficient and economical performance. Preferably, the springs are formed of metallic material that is shot-peened so as to provide for a long service life.

In a preferred embodiment, the device 1 has supplemental wire windings around the main portion of the coil to function as a heat sink to help dissipate the heat generated during continuous play. For example, in an embodiment shown in the cut-away sectional view in FIG. 1, the first coil windings 6, which are the windings that are electrically energized during activation of the coil 2, are surrounded by separate, supplemental windings 10. The supplemental windings 10 are not electrically energized; instead they are non-energized and act as a heat sink to aid dissipation of heat from the energized windings 6 when the latter have electrical current flowing through them during activation of the coil 2. Preferably the supplemental wire windings 10 are formed of copper wire. A similar construction may preferably be applied to the second coil 12, for which supplemental wire windings are not shown in the drawings.

As seen in FIGS. 1 and 2, each coil 2, 12 in the device 1 preferably has an opening on its outer end, instead of a stop as in prior devices. The outer end opening 8 of the first coil 2 is shown in FIG. 2, and the outer end opening 18 of the second coil 12 is shown in FIG. 1. The construction with outer end openings 8, 18, instead of interior or end stops as in prior devices, avoids a hard impact between the end of the rod and the stop when the rod reaches the full extent of its stroke. In the device 1 disclosed herein, the full extent of the rod stroke is defined by the weight 22 meeting with one of the damping pads 40 or 42, instead of a collision between the end of the rod and the stop of the energized coil as in prior devices. The openings 8, 18 on the outer ends of the respective coils 2, 12 also allow for wear particles to be ejected from the core or sleeve inside the coils, through the openings 8, 18, to avoid build-up of wear particles within the core. The outer end openings 8, 18 provide the further benefit of access to air so as to allow air to be pumped into the sleeve with each stroke of the rod 20, thereby assisting in cooling of the coil 2, 12.

The device 1 offers the advantage of dynamic control of the impact frequency and intensity of haptic feedback to the player in two directions, in order to more effectively mimic the sensations felt by users of a variety of weapon styles. By dynamically controlling the electrical current supplied through each coil 2, 12, the force exerted by each coil 2, 12 on the rod 20 can be dynamically controlled during all phases of movement of the rod 20. This allows dynamic speed control of the rod 20, and hence of the weight 22, in both directions along the axial direction A of the rod 20, at all times. By dynamically controlling the rod speed in both directions, new and interesting haptic effects can be produced. This represents an improvement over prior devices which only allow the possibility of force control in one direction, with the other direction's force exerted by a static spring.

For example, energizing only one coil lightly (e.g., a brief application of electrical current) can cause a single impact between the weight 22 and the pad 40 or 42 that feels to the player's hand H like the sensation from firing a single shot from a pistol. Energizing one coil harder (e.g., a longer application of current) can produce a much greater impact, yielding a more powerful sensation to the player resembling that of firing a rifle or shotgun. By quickly alternating energizations of the two coils 2, 12, the device can generate to the player's hand a sensation of the repeated firing of a machine gun. Any number of other sensations can be created, including shaking the weight 22 back and forth along the axial direction A of the rod 20 without impacting either pad, to produce a vibration feel to the player's hand H.

The device 1 preferably includes a means for sensing the position of the rod 20 and its attached weight 22 relative to the two coils 2, 12. This sensor detects the position of the rod 20 over time, and collects data on the rod position. The rod position sensor 44 contains hardware and software elements allowing it to generate and send to the control unit (described below) electronic signals containing the collected rod position data.

Figure 6:
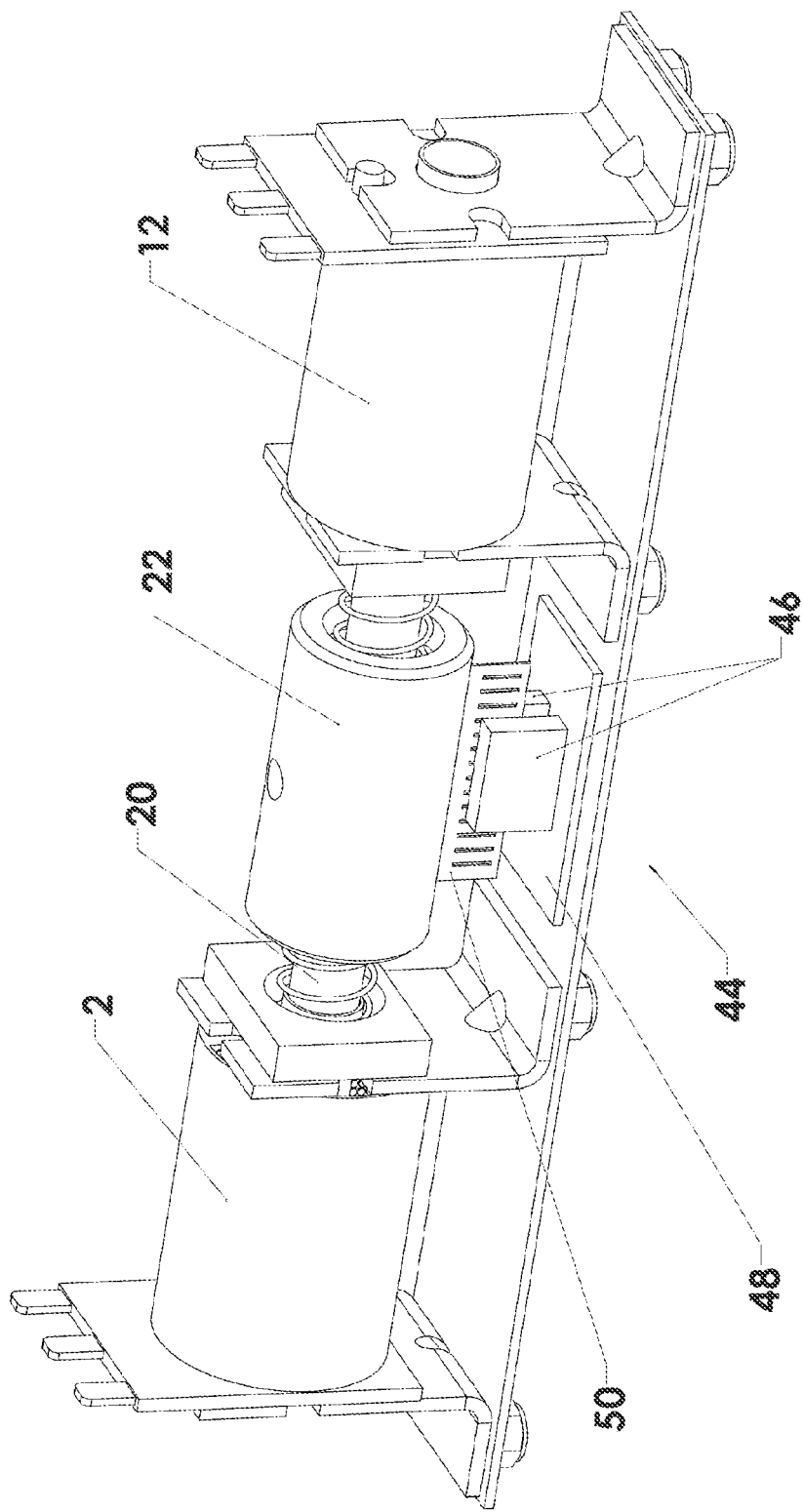
FIG. 6 is a perspective view of the device in an embodiment having an optical rod position sensor.
Figure 7:
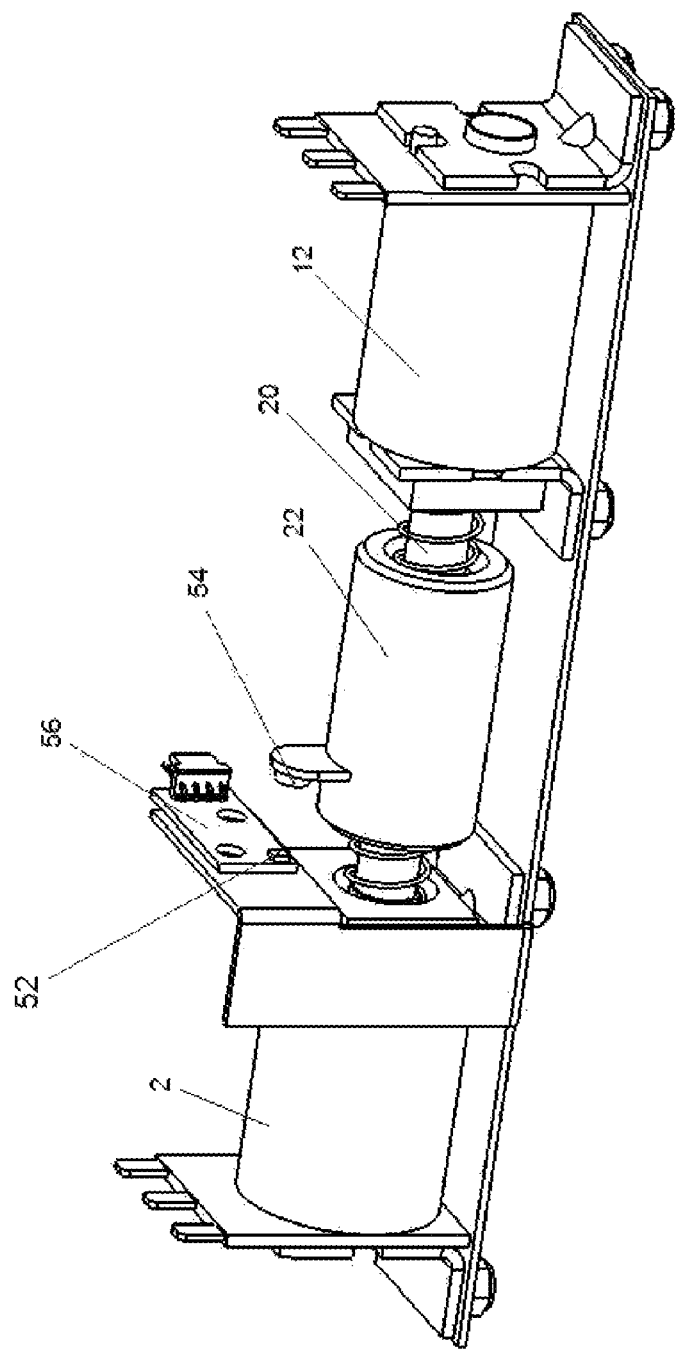
FIG. 7 is a perspective view of the device in an embodiment having a Hall Effect rod position sensor.

Two different preferred embodiments of the rod position sensor 44 are depicted in FIGS. 6 and 7, respectively. In FIG. 6, the rod position sensor 44 is in the form of an optical position sensor. One or more sensors may be employed. The optical position sensor may preferably operate by projection of optical waves from one or more optical projection and reception units 46 operatively connected to a printed circuit board 48. The projected optical waves may be reflected by an optical strip 50 attached to the rod 20 and/or the weight 22, such that, based on the patterns of transmission or reflection of the optical waves back to the transmitting unit 46 or between two respective projection and reception units 46, the projection and reception units may collect data on the position of the optical strip 50, and accordingly, determine the position of the rod 20 and weight 22 attached thereto. The printed circuit board 48 preferably may have electronic circuitry adapted and structured to convert the optical wave transmission and reception pattern data received by the projection and reception units 46 into electronic signals comprising the data on the rod position. The printed circuit board 48 preferably is electronically connected to the dynamic control system, and is structured to generate and convey the electronic signals comprising the rod position data to the dynamic control system.

In FIG. 7, a second embodiment of a rod sensor 44 is depicted, in the form of a Hall Effect sensor. In the embodiment of the Hall Effect sensor shown in FIG. 7, a Hall Effect sensor unit 52 is an electronic transducer that varies voltage of an electrical current that the transducer outputs, in response to the sensor's level of proximity to a magnet borne on a magnet mount 54. The magnet mount 54 preferably is attached to the weight 22 as shown in FIG. 7, and the sensor unit 52 preferably is attached to one of the coils 2 or 12, or is attached to a respective inner brace 34 or 36 of one of the coils. In this manner the patterns of movement of the rod and weight may be detected as variations in the proximity of the magnet on the magnet mount 54 as sensed by the sensor unit 52. More than one Hall Effect sensor may be employed in some embodiments, one on each of the coils.

The Hall Effect sensor unit 52 outputs the current, with its variations in voltage reflecting the proximity patterns, as electronic signals containing the proximity position information, and hence the rod position data, to the printed circuit board 56 that is operatively attached to the sensor unit 52. The printed circuit board 56 preferably has electronic circuits adapted and structured to receive the electronic signals containing the rod position data. The printed circuit board 56 preferably is electronically connected to the dynamic control system, and is structured to generate and convey the electronic signals comprising the rod position data to the dynamic control system.

Figure 8:
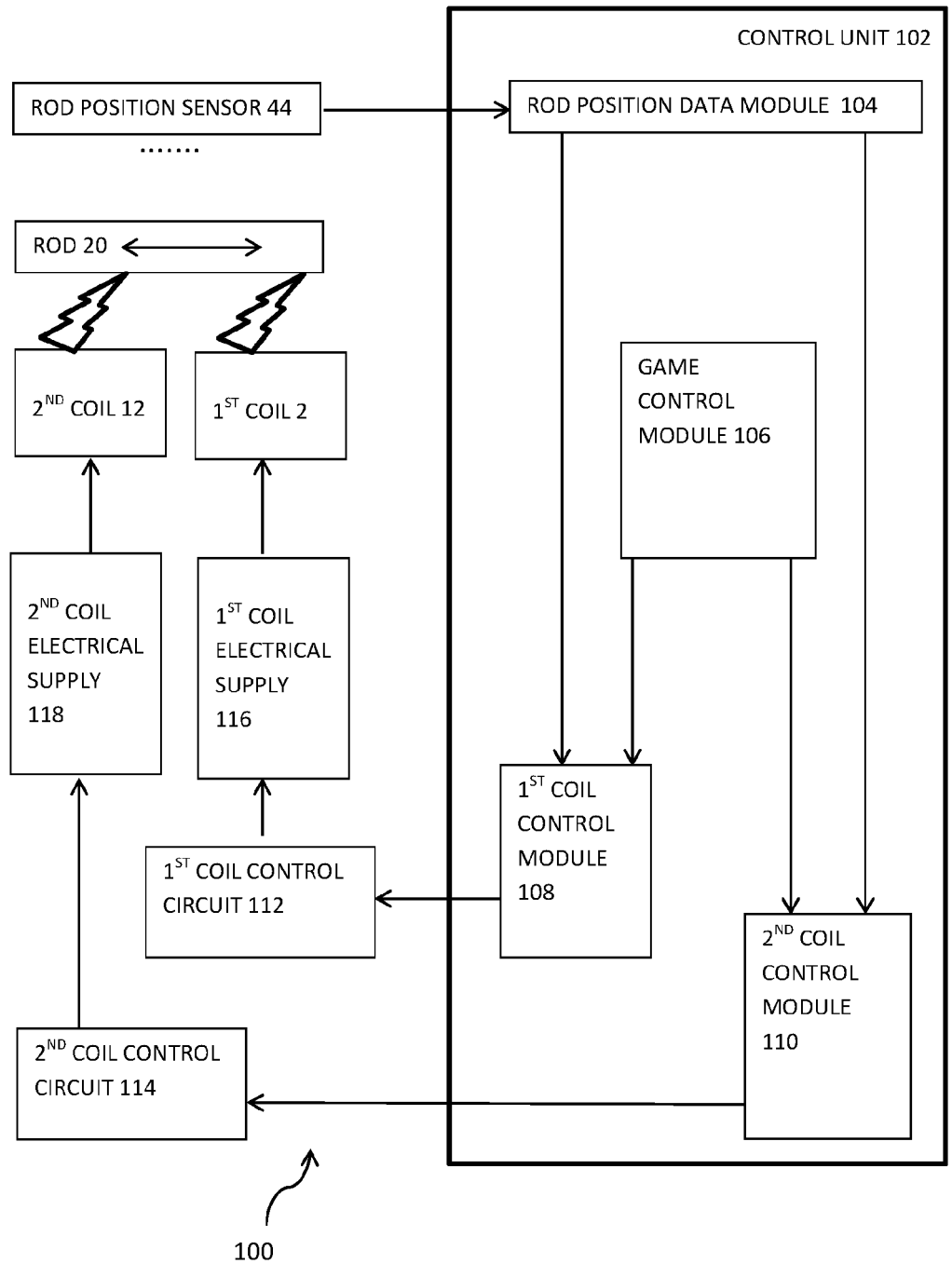
FIG. 8 is a schematic block diagram of a control system for a haptic feedback device.

An example of a dynamic control system of the haptic feedback device is provided in FIG. 8, which is a schematic block diagram showing such a control system. As shown in FIG. 8, the system 100 includes a processing system including a control unit 102. It is noted that the processing system may be structured with control units or control subunits, modules, sensors, actuators, communication links, and other devices known in the art for performing the operations described herein. Control unit 102 may be a single device or a distributed device, and the functions of control unit 102 may be performed by hardware or software. All commands and information may be provided in alternate forms, some information may not be present in certain embodiments, and additional information may be present in certain embodiments. Information may be interpreted from sensor inputs, from datalink communications, from parameters on a storage medium readable by a computer, or through other information gathering devices understood in the art.

In certain embodiments, control unit 102 includes one or more modules structured to functionally execute its operations. The description herein including modules emphasizes the structural independence of the aspects of control unit 102, and illustrates one grouping of operations and responsibilities of control unit 102. Other groupings that execute similar overall operations are understood within the scope of the present application. Modules may be implemented in hardware and/or software on computer readable medium, and modules may be distributed across various hardware or software components or circuitry. More specific descriptions of certain embodiments of control unit operations are provided below in connection with the schematic illustration of FIG. 8.

As shown in FIG. 8, control unit 102 includes a game control module 106 that may contain stored information pertaining to game settings, for example settings commanding a particular type of game play and accompanying feedback settings. Thus the device can provide different haptic feedback in different video games, perhaps mimicking the sensations of operating a semi-automatic pistol in a first setting mode in a first game, while mimicking the sensations of operating a machine gun in a second setting mode in a second game. The settings may be a combination of settings set by the video game manufacturer and selected by choice of the player. The game control module is structured to send coil control signals to a first coil control module 108 and a second coil control module 110.

The two coil control modules 108 and 110 are structured to receive and interpret the coil control signals received from the game control module 106, as shown in FIG. 8. The coil control modules 108, 110 are also structured to generate and send to first and second coil control circuits 112, 114 electronic signals that command operations of first and second control circuits 112, 114 based on coil control signals received from the game control module 106. For example, the signals may instruct the circuits 112, 114 to control on/off activation of the electrical supply connections to each coil; may instruct the circuits 112, 114 to control frequency, length, and repetition of patterns of the on/off cycles of activation of the electrical supply connections to each coil; and/or may instruct the circuits 112, 114 to control a level of voltage supplied to each of the coils via the electrical supply connections during a given "on" cycle.

In turn, the first and second control circuits 112, 114 each separately control an electrical supply connection 116, 118 to the first and second coils 2, 12, respectively. In this manner, electrical currents are supplied to each of the two separate coils 2, 12 independently. Due to the patterns instructed by the circuits 112, 114 based on the control signals conveyed by the coil control modules 108, 110, the electrical current pulses supplied to the coils 2, 12 via the electrical supplies 116, 118 vary in accord with the game settings stored in the game control module 106. Thus, electrical supply to each coil varies independently for each coil, and is separately controlled with regard to voltage, duration, repeat frequencies, etc., of the electrical current supplied to each coil. This allows for control of the movements of rod 20 along its axial direction, in terms of speed and stroke length, as well as in repetition patterns, based on inductance from each of the two coils 2, 12.

Preferably, the system includes a rod position sensor 44 as depicted in FIGS. 6-7. As explained previously with respect to FIGS. 6 and 7, the rod position sensor 44, in any of its disclosed embodiments, detects the position of the rod 20 over time, and collects data on the rod position. The rod position sensor 44 contains hardware and software elements allowing it to generate and send to the rod position data module 104 in the control unit 102 the electronic signals containing the collected rod position data. The rod position data module 104 is structured to then interpret the rod position data and incorporate the data into electronic signals sent to the game control module 106. Thus, as shown in the system depicted in FIG. 8, bi-directional dynamic force data can be supplied to the first and second coil control modules 108, 110 to be used to control the location of the rod/weight in a closed loop feedback control system. Since the dynamic force exerted on the rod 20 is bi-directional, the feedback loop is able to use the position data to position or re-position the rod more quickly than in a non-dynamic "traditional" single-directional dynamic force system using only a spring to exert an opposing force to the single coil.

Figure 9:
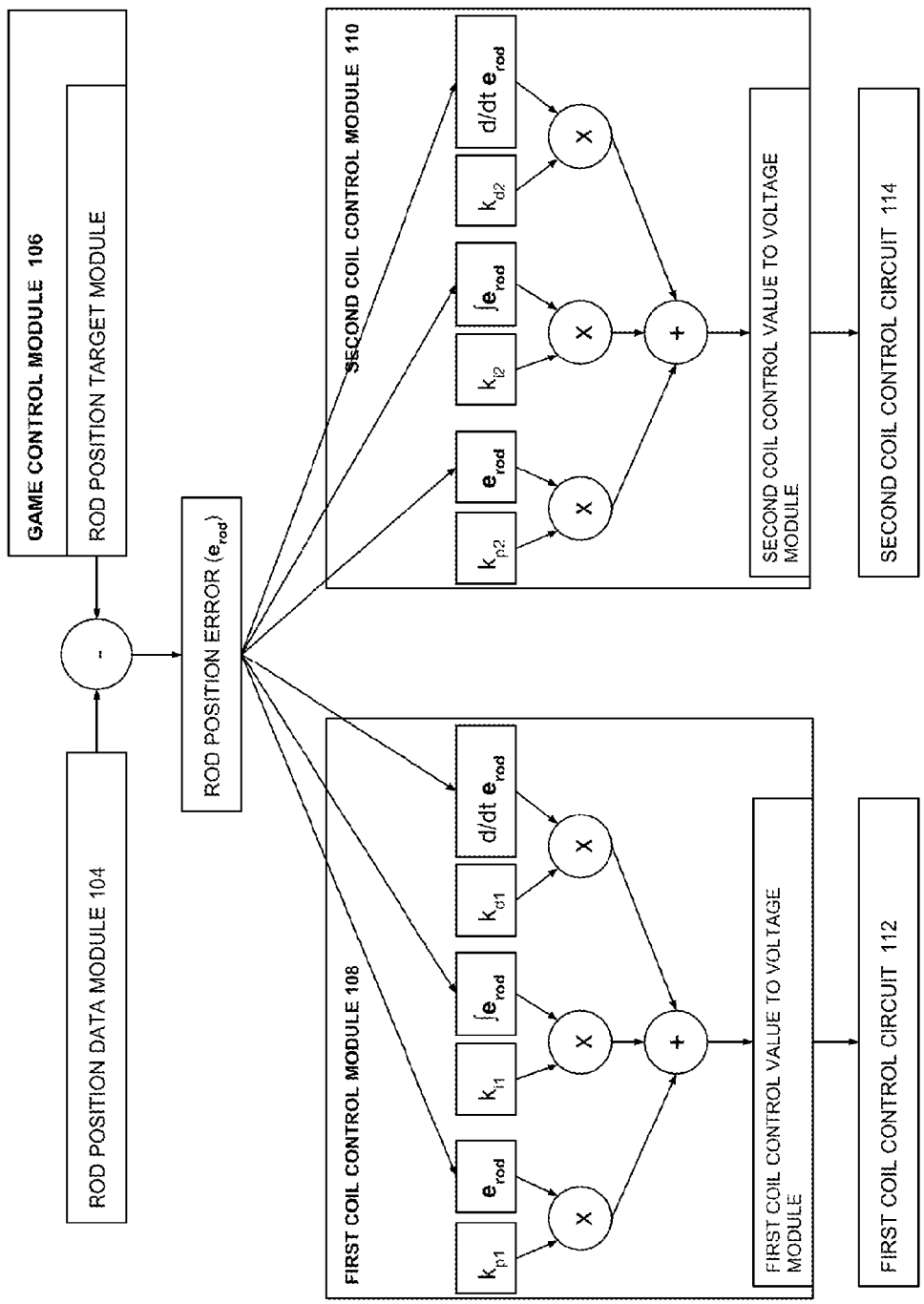
FIG. 9 is a schematic diagram of the operations of a control unit of the haptic feedback device.

An example of operations of the game control unit 102 is represented in the diagram of FIG. 9. During the course of game-play, the game control module 106 determines the best effect to simulate for the current game situation. For example, this effect can be the simulation of a weak vibration or the simulation of a machine gun quickly firing ammunition.

The game control module 106 then determines where and when to move the weighted rod 20 in order to achieve the desired haptic effect. Periodically, the game control module 106 gives this information, the target rod position, to each of the coil control modules 108, 110. The coil control modules 108, 110 are also provided the current rod position by the rod position data module 104. The coil control module 108, 110 calculates the distance between the current and target positions of the weighted rod 20.

The coil 2, 12 can only pull the rod 20 toward itself; the coil cannot push the rod away. When the target rod position is farther away from the coil than the current rod position, the control module 108, 110 de-energizes the coil, since pushing the rod farther away from the coil is not possible. When the target rod position is closer to the coil than the current rod position, the coil is energized in order to pull the rod closer to the coil 2, 12 and thus closer to the target position. When the rod reaches the target position, both coils 2, 12 are de-energized.

In one simplified implementation of the coil control module 108, 110 shown in FIG. 9, the constants ki1 and kd1 of the first coil control module 108 and ki2 and kd2 of the second coil control module 110 are set to 0. The constants kp1 and kp2 of the coil control modules 108, 110 are non-zero. In this case, the voltage applied to energize the coil is proportional to the distance between the target and current rod positions.

The complete coil control module 108,110 in FIG. 9 implements a PID algorithm (proportional-integral-derivative algorithm) to calculate the coil energization voltage. In addition to the distance between the target and current rod positions (proportional), the PID implementation also takes into account how fast the rod is approaching the target position (derivative) and how long the rod has been away from the target position (integral). At each point in time (t), each coil control module 108, 110 compares the desired position p(t) of the rod 20 to the position measured by the rod sensor 44, by subtracting the value of the two positions. The difference, if any, is the error (err) between the measured and target positions of the rod 20. For each coil 2, 12, the x origin (x=0), respectively located at the end-stop for that coil, and increases in the direction toward the other coil. To this end, there are two error values calculated, one for each coil. err(coil_1) and err(coil_2). For each coil, a control value control(coil_n) is calculated by summing the following three components (where n=1 or 2 and kp, ki, kd are predetermined constants):

$k_{pn} \times \text{err}(\text{coil}\_n)$ $k_{dn} \times d\text{err}(\text{coil}\_n)/dt$ $k_{in} \times \text{integral of err}(\text{coil}\_n)$ For each of the control values, control(coil_1) and control(coil_2), calculated above, the voltage then applied to the coil is:

0 if control(coil_$i$)>=0

Proportional to control(coil_$i$) if control(coil_$i$)<0

At each time interval, t(i), this process is repeated. By repeating this process periodically, the rod will approximately follow the desired path set by rod position target module which, in turn, simulates the desired effect of the game control module 106.

The device and system are not limited to applications in a gun-type hand-held game controller 38, although that is a preferred embodiment as disclosed herein. The device and system could be used in other controllers or areas of a game to impart a motion or other haptic sensation. Also disclosed is a video game incorporating the haptic feedback device as disclosed herein, with the device incorporated into a game controller, preferably with the video game incorporating game player input/output interfaces such as display screens, coin-operated game activation elements, and control elements including buttons or switches, a game control system such as control system 100 described herein including hardware and software elements for controlling operation of the game, electrical supply means, and a cabinet.

Disclosed is: a haptic feedback device, a haptic feedback system, a controller comprising a haptic feedback device, a game controller comprising a haptic feedback device, and a game comprising a controller for generating haptic sensations to a user of the game. In various embodiments of the foregoing invention, the device, system, game, or controller comprises a first solenoid coil and a second solenoid coil disposed in stationary positions relative to one another, each coil having an open core and electrical connections for supply of electrical current through the coil to energize the coil to generate a magnetic flux; a plunger disposed to move in an axial direction between the first and second coils upon energization of one or more of the coils in response to the magnetic flux, the plunger having a first end inserted into and disposed to move within the core of the first coil and a second end inserted into and disposed to move within the core of the second coil; a weight attached to the plunger between the first and second coils; a first damper disposed between the weight and the first coil; and a second damper disposed between the weight and the second coil, wherein, upon energization of the first coil, the magnetic flux causes the plunger to move toward the first coil so that the weight contacts the first damper, generating haptic sensations to the user, and upon energization of the second coil, the magnetic flux causes the plunger to move toward the second coil so that the weight contacts the second damper, generating haptic sensations to the user. For control of plunger position, also disclosed is a dynamic current source for each coil disposed to generate dynamic magnetic flux in each coil to generate a dynamic bi-directional force on the plunger; a plunger position sensor disposed to detect a position of the plunger with respect to the first and second coils; and a plunger position controller for controlling the position of the plunger, wherein the plunger position controller applies a dynamic bi-directional force on the plunger to move the plunger to a target position based on the current position of the plunger detected by the plunger position sensor.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary, and embodiments lacking the same and excluding the same also may be contemplated as within the scope of the invention. The above-described embodiments of the present invention have been provided to illustrate various aspects of the invention. However, it is to be understood that different aspect of the invention shown in different specific embodiments can be combined to provide other embodiments of the invention. In reading the claims, it is intended that when words such as "a," an," "at least one," or "at least one portion" are used there is no intention to limit the claim to only one item unless specifically stated to the contrary in the claim. When the language "at least a portion" and/or "a portion" or "portions" is used the item can include a portion and/or the entire item unless specifically stated to the contrary.

LIST OF REFERENCE NUMERALS

1 device
2 first coil
4 first coil cover
6 first coil windings
8 outer end opening in first coil
10 supplemental windings in first coil
12 second coil
14 second coil cover
16 second coil windings (not shown)
18 outer end opening in second coil
20 rod
22 weight
24 first spring
26 second spring
28 frame
30 first outer brace
32 second outer brace
34 first inner brace
36 second inner brace
38 game controller
40 first damping pad
42 second damping pad
44 rod position sensor
46 optical projection/reception unit
48 optical printed circuit board
50 optical strip
52 Hall Effect sensor unit
54 magnet mount
56 Hall Effect printed circuit board
A axial direction of movement of rod 20
H player's hand
100 control system
102 control unit
104 rod position data module
106 game control module
108 first coil control module
110 second coil control module
112 first coil control circuit
114 second coil control circuit
116 first coil electrical supply connection
118 second coil electrical supply connection
120 first coil electrical connection mount
122 second coil electrical connection mount

The invention claimed is:

1. A haptic feedback device for generating haptic sensations to a user of the device, comprising:

a first solenoid coil and a second solenoid coil disposed with a space between the first and second coils, each coil having an open core and connections for supply of electrical current through the coil to energize the coil to generate a magnetic flux; and a plunger disposed to move in an axial direction in the space between the first and second coils upon energization of one or more of the coils in response to the magnetic flux, the plunger having a first end disposed to move within the core of the first coil and a second end disposed to move within the core of the second coil, wherein upon energization of the first coil, the magnetic flux causes the plunger to move toward the first coil so that a part of the plunger engages with the first coil to generate haptic sensations to the user.

2. The device according to claim 1, wherein the first coil and the second coil are disposed in stationary positions relative to one another.

3. The device according to claim 1, further comprising a weight attached to the plunger between the first and second coils.

4. The device according to claim 3, further comprising a first damper disposed between the weight and the first coil, and a second damper disposed between the weight and the second coil, wherein, upon energization of the first coil, the weight contacts the first damper.

5. The device according to claim 1, wherein, upon energization of the second coil, the magnetic flux causes the plunger to move toward the second coil so that the a part of the plunger engages with the second coil to generate haptic sensations to the user.

6. The device according to claim 5, wherein the first coil and the second coil are disposed in stationary positions relative to one another.

7. The device according to claim 5, further comprising a weight attached to the plunger between the first and second coils.

8. The device according to claim 7, further comprising a first damper disposed between the weight and the first coil, and a second damper disposed between the weight and the second coil, wherein, upon energization of the first coil, the weight contacts the first damper, and upon energization of the second coil, the weight contacts the first damper.

9. A game controller for generating haptic sensations to a user of a game, comprising:
- a dual linear solenoid device comprising a first solenoid coil and a second solenoid coil, each coil having an open core and connections for supply of electrical current through the coil to energize the coil to generate a magnetic flux, and
- a plunger disposed to move in an axial direction between the first and second coils upon energization of one or more of the coils in response to the magnetic flux, the plunger having a first end disposed to move within the core of the first coil and a second end disposed to move within the core of the second coil,
- a weight attached to the plunger between the first and second coils,
- a first damper disposed between the weight and the first coil, and
- a second damper disposed between the weight and the second coil, wherein,
- upon energization of the first coil, the magnetic flux causes the plunger to move toward the first coil so that the weight contacts the first damper, generating haptic sensations to the user, and
- upon energization of the second coil, the magnetic flux causes the plunger to move toward the second coil so that the weight contacts the second damper, generating haptic sensations to the user.

10. A game comprising a controller for generating haptic sensations to a user of the game, the controller comprising a first solenoid coil and a second solenoid coil, each coil having an open core and connections for supply of electrical current through the coil to energize the coil to generate a magnetic flux,
- a plunger disposed to move in an axial direction between the first and second coils upon energization of one or more of the coils in response to the magnetic flux, the plunger having a first end disposed to move within the core of the first coil and a second end disposed to move within the core of the second coil,
- a weight attached to the plunger between the first and second coils,
- a first damper disposed between the weight and the first coil, and
- a second damper disposed between the weight and the second coil, wherein,
- upon energization of the first coil, the magnetic flux causes the plunger to move toward the first coil so that the weight contacts the first damper, generating haptic sensations to the user, and
- upon energization of the second coil, the magnetic flux causes the plunger to move toward the second coil so that the weight contacts the second damper, generating haptic sensations to the user.

11. A haptic feedback device for generating haptic sensations to a user of the device, comprising:
- a first solenoid coil and a second solenoid coil disposed with a space between the first and second coils, each coil having connections for supply of electrical current through the coil to energize the coil to generate a magnetic flux;
- a plunger disposed to move in an axial direction in the space between the first and second coils upon energization of one or more of the coils in response to the magnetic flux, the plunger having a first end disposed to move within the core of the first coil and a second end disposed to move within the core of the second coil; and
- a dynamic current source for each coil disposed to generate dynamic magnetic flux in each coil, wherein a dynamic bi-directional force is exerted on the plunger.

12. A haptic feedback device for generating haptic sensations to a user of the device, comprising:
- a first solenoid coil and a second solenoid coil, each coil having connections for supply of electrical current through the coil to energize the coil to generate a magnetic flux;
- a plunger disposed to move in an axial direction between the first and second coils upon energization of one or more of the coils in response to the magnetic flux, the plunger having a first end disposed to move within the core of the first coil and a second end disposed to move within the core of the second coil;
- a dynamic current source for each coil disposed to generate dynamic magnetic flux in each coil to generate a dynamic bi-directional force on the plunger;
- a plunger position sensor disposed to detect a position of the plunger with respect to the first and second coils; and
- a plunger position controller for controlling the position of the plunger wherein the plunger position controller applies a dynamic bi-directional force on the plunger to move the plunger to a target position based on a current position of the plunger detected by the plunger position sensor.

13. The device according to claim 1, further comprising a plunger position sensor disposed to detect a position of the plunger with respect to the first and second coils.

14. The device according to claim 2, further comprising a plunger position sensor disposed to detect a position of the plunger with respect to the first and second coils.

15. The device according to claim 3, further comprising a plunger position sensor disposed to detect a position of the plunger with respect to the first and second coils.

16. The device according to claim 4, further comprising a plunger position sensor disposed to detect a position of the plunger with respect to the first and second coils.

17. The device according to claim 5, further comprising a plunger position sensor disposed to detect a position of the plunger with respect to the first and second coils.

18. The controller according to claim 9, further comprising a plunger position sensor disposed to detect a position of the plunger with respect to the first and second coils.

19. The game according to claim 10, further comprising a plunger position sensor disposed to detect a position of the plunger with respect to the first and second coils.

20. The device according to claim 11, further comprising a plunger position sensor disposed to detect a position of the plunger with respect to the first and second coils.

* * * * *